US007532223B2

(12) United States Patent
Dougherty

(10) Patent No.: US 7,532,223 B2
(45) Date of Patent: May 12, 2009

(54) APPARATUS AND METHOD FOR TEACHING ARTWORK AND COSMETIC ADJUSTMENT ON THE HUMAN FORM USING 4D RENDERING

(76) Inventor: Teri Lynn Dougherty, 100 Willow Valley Rd., Nevada City, CA (US) 95959

( * ) Notice: Subject to any disclaimer, the term of this patent is extended or adjusted under 35 U.S.C. 154(b) by 380 days.

(21) Appl. No.: 11/336,833

(22) Filed: Jan. 17, 2006

(65) Prior Publication Data

US 2007/0165032 A1 Jul. 19, 2007

(51) Int. Cl.
G09G 5/00 (2006.01)
G06F 3/00 (2006.01)
G06F 3/48 (2006.01)

(52) U.S. Cl. .................. 345/619; 345/679; 345/633; 345/649; 345/156; 715/700; 715/856; 715/861

(58) Field of Classification Search .......... 345/473, 345/619, 581, 418–420, 594, 632–633, 649–650, 345/653, 659, 156, 163, 678–679; 715/200–203, 715/700, 866, 706–707, 856–861, 764, 786, 715/850; 382/154, 118
See application file for complete search history.

(56) References Cited

U.S. PATENT DOCUMENTS

| 7,227,544 B2 * | 6/2007 | Alkouh ..................... 345/419 |
| 7,246,045 B1 * | 7/2007 | Rappaport et al. ............. 703/2 |
| 7,277,572 B2 * | 10/2007 | MacInnes et al. ........... 382/154 |
| 2004/0181374 A1 * | 9/2004 | Rappaport et al. ............. 703/1 |
| 2005/0068315 A1 * | 3/2005 | Lewis et al. ................ 345/419 |
| 2006/0023923 A1 * | 2/2006 | Geng et al. ................. 382/116 |
| 2006/0078172 A1 * | 4/2006 | Zhang et al. ............... 382/118 |
| 2006/0084858 A1 * | 4/2006 | Marks ........................ 600/407 |

* cited by examiner

Primary Examiner—Wesner Sajous
(74) Attorney, Agent, or Firm—Workman Nydegger

(57) ABSTRACT

This invention is an application of 4D human form modeling technology enabled by high-speed data processes and a temporal adjustment scheme for teaching and understanding external and/or cosmetic changes on the human form. The potential applications of this technology are limitless within the confines of external human modeling and are only confined by the system's ability to process human form data. A source is defined by content to be replicated and displayed, and all associated components. The source may be either data captured in real-time or in some mannequin form or component already available. The source is processed and displayed on a medium that is appropriate for the distribution of the source. Since there are varying systems for displaying information and display technology is a dynamic medium, this invention is applicable to all existing and planned display apparatus for the foreseeable future. The system generates a model and a corresponding series of temporal events and streams data to the display as appropriate for each view and point in time. The display can act completely dynamically and each point in space and time can be view independently. The system uses a 4D model to develop a more complete understanding of the processes and effects the beginning and outcome at the end of a temporal event. By allowing each point in time and space to be visited at will; each step in a process can be revisited to better clarify each change and step.

7 Claims, 1 Drawing Sheet

ILLUSTRATIONS AND THEIR DESCRIPTIONS

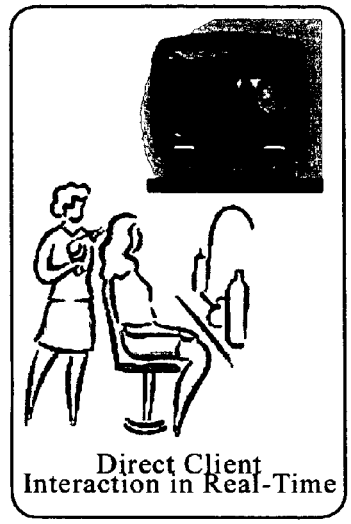

Direct Client Interaction in Real-Time

Description: Illustration of the real time use in a training and demonstration scenario that allows the subject / student to the view the process, the addition of options and adjustments, and the reprocessing of information. The process may be refined and each step demonstrated and revisited in order to achieve the desired outcome.

ILLUSTRATIONS AND THEIR DESCRIPTIONS

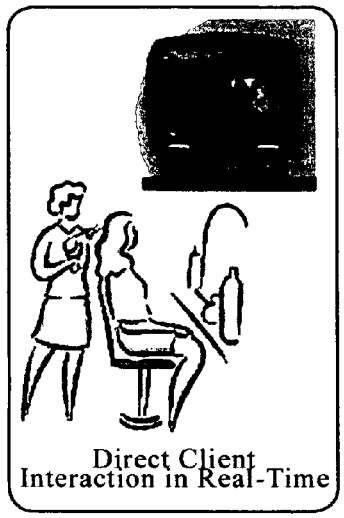

Figure 1 Description: Illustration of the real time use in a training and demonstration scenario that allows the subject / student to the view the process, the addition of options and adjustments, and the reprocessing of information. The process may be refined and each step demonstrated and revisited in order to achieve the desired outcome.

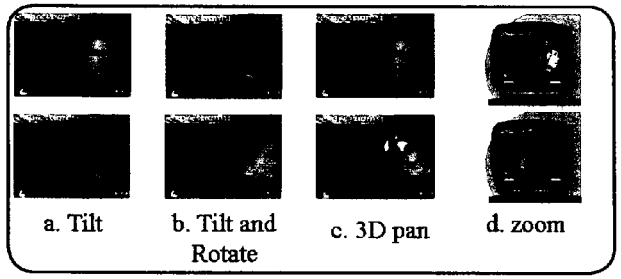

Figure 2 Description: Illustrates a few of the possible controls for the output to display. Each control may be performed individually or in combination to speed processes and more effectively train the technician.

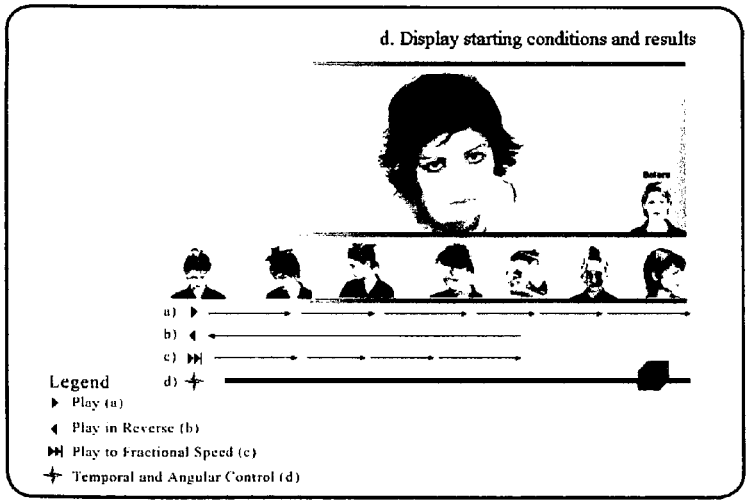

Figure 3 Description: Illustrates a playback scenario and each corresponding step. I this Illustration, the overall view shows a start and finish (before and after) - and seven main steps shown as avatars for place holding and allowing the technician to get a quick overview of the process. A bar, t o represent temporal motion control, and a cube, for angular control, allows the display process to be changed and reviewed from any angle or point in time.

APPARATUS AND METHOD FOR TEACHING ARTWORK AND COSMETIC ADJUSTMENT ON THE HUMAN FORM USING 4D RENDERING

FIELD OF INVENTION

This invention relates to the general usage of a 4D modeling system and its components to better understand, teach, and tune the outcome of an event's effects on the cosmetic human form.

BACKGROUND

This system was developed to meet the needs for dissemination of educational and training content. It addresses the needs of scalability and dynamic elements as well as future desired developments. Current systems used for human form dynamic display and understanding, are usually distributed in some video only form. This does not allow for the scalability of the effects of dynamic elements on the form and the effects on the outcome. As the market for this technology is developed, it is clear that there are many real world applications that could benefit from this technology.

From the work to create an unprecedented, three dimensional, navigable, animated presentation of teaching methods, a system was developed that included past work and added links to the web for advertising or product information—becoming very dynamic. The system is scalable, portable and platform independent. The first iteration is stand-alone and is used as a presentation tool when educating, but it was clear that the system could be scalable to any number of systems in utilizing video and other interactive formats.

The system displays the human form in three dimensions and has free control over its movement with point-in-time manipulation. Music score and advertising information were added to allow the viewers a more complete interactive educational experience.

The current human form modeling systems are not typically 3D in nature, and are more historically distributed in video format—to allow ease of playback. This system works well, but it is limited to viewing only with some small amounts of tuning in an avatar format that is very limited on its scalability. This system allows for the dissemination of an event's effects on the human form, allowing for changes and tuning as well as a much deeper understanding, thus eliminating the fixed nature of viewing a video. Duplication and replication may also be enhanced, since it is scaleable and has no requirements on the content displayed (ie interactive or not).

There are many modeling systems available today, and each system addresses specific needs for each subject. This invention allows for the subject to choose the appropriate components and manipulate the data to as many configurations and scenarios as desired, getting the effects to their desired points and providing a thorough understanding of the effects. Playback often contains subsystems that have multiple devices for displaying data but do not have the ability for manipulation. Once the process is understood, the cosmetic changes and be viewed and preformed, with an increased level of expertise and proficiency not obtainable in the current medium.

Limitless configuration in time and space is clearly a highly desired feature when conveying understanding of the development of a form is considered. This system has the ability to scale from a single series of events to infinity. Using a configurable system enables the system to scale and can exploit newer distribution systems (such as DVD) at a cost and functionally effective point. This system allows users to choose their playback needs and may leave the system open to future needs. Clearly this is a highly desirable feature in the training environment.

As the data is broadcast to the display targets, and no constraints need to be placed on the targets. They accept data as needed and make it available for display and manipulation. The data can be stored for future use/manipulation and/or direct display. Flexibility in scalability and display gives the users the opportunity to choose the implementation's best fit.

SUMMARY OF INVENTION

In one aspect of the invention, a teaching method includes collecting source information regarding a human subject, modeling performance of a series of steps on the human subject using the source information, and graphically displaying on a display apparatus a progression of the three dimensional representation of the human subject undergoing the series of steps. While graphically displaying on the display apparatus the progression of the three dimensional representation of the human subject undergoing the series of steps, user inputs may be received. The method may include changing a viewing perspective of the three dimensional representation of the human subject responsive to the user inputs.

In another aspect of the invention changing the viewing perspective of the human subject comprises at least one of rotating the three dimensional representation of the human subject, panning with respect to the three dimensional representation of the human subject, and zooming with respect to the three dimensional representation of the human subject. Collecting source information may include collecting at least one of form, skin type, head surface contours, hair texture, and color.

In another aspect of the invention, the teaching method includes displaying a bar having a three dimensional object and receiving inputs from a pointing device with respect to the three dimensional object indicating at least one of rotation of the three dimensional object and sliding of the three dimensional object along the bar. The method may include rotating the three dimensional representation of the human subject responsive to inputs from the pointing device indicating rotation of the three dimensional object. The method may further include advancing or reversing the series of steps with respect to the human subject responsive to inputs from the pointing device indicating sliding of the three dimensional object along the bar.

BRIEF DESCRIPTION OF THE FIGURES

FIG. 1 is a schematic illustration of a training scenario including a display apparatus used in accordance with an embodiment of the present invention.

FIG. 2 is an illustration of controls for outputs displayed in accordance with an embodiment of the present invention.

FIG. 3 is an illustration of a user interface in accordance with an embodiment of the present invention.

DETAILED DESCRIPTION OF THE INVENTION

The source collects the appropriate information and/or source data compiles the information into an appropriate model. This may include many different aspects of the human form, corresponding subsets, and components, but for the purpose of disclosure, a training system for hair design will be used. Data is collected and formatted for the appropriate skin type, head surface contours, hair texture and color, and well as the desired results. The information is compiled into a series of steps to achieve the desired results. The process can be optimized to make the process of treating the hair streamlined. Once the source is ready and, if desired—the display targets are ready, the process begins.

The display on the medium is dynamic, but can be played to emulate a standard video system without and temporal or zoom enhancements, to provide a first pass overview of the training module. As the display occurs, the stream may be stopped, turned, zoomed, panned out, played backwards, etc.; all to provide the end user with an infinite ability to develop an in-depth understanding of each portion of the haircut and coloring process. In a teacher run scenario, the data may be streamed live to a display system that could teach multiple students, without the need of editing or formatting to expedite real-time distribution of content. Once the parametric data is broadcast to each display system, the content can be viewed and modified as appropriate.

The most prevalent system for broadcasting data is IP (Internet Protocol). This allows virtually limitless connectivity and availability of a connection most anywhere. It is ideal for this type of system but has limitations, connectivity and bandwidth being the most obvious. This system can be applied to any broadcast medium, but for the intent of disclosure, IP will be used.

The display targets receive the data and allow an appropriate level of output control for each individual device. The data then can be used directly, (as in a photo image of a particular client), replicated for distribution, (as in a training system) or saved as an archive, (for historical purposes). The archives can be used for any data function, including rebroadcast. Since there can exist multiple display targets, each target may handle its own data in a self appropriate manner (such as a DVD burn). The application of storage is not critical, and it may be desirable to mix targets (FTP site and DVD burn simultaneously).

Each display system at minimum allows for the output and renders a virtual or literal 3D image with a temporal, (time) control. As the events in time are displayed, the user has the ability to seamlessly move, zoom, and even revise the steps in the display process. This system of dynamically adjusting the output display greatly enhances the ability of the end user to view, obtain, and retain the information being presented during the display system. In our example of haircut and color training, a color may be applied in a certain manner with an intermix of cutting and coloring steps to provide optimal results. These steps all for viewing slight changes and the end effects on the hair.

What is claimed is:

1. A teaching method for presenting a demonstration comprising:
   collecting source information regarding a human subject;
   modeling performance of a series of steps on the human subject using the source information;
   graphically displaying on a display apparatus a progression of the three dimensional representation of the human subject undergoing the series of steps; and
   while graphically displaying on the display apparatus the progression of the three dimensional representation of the human subject undergoing the series of steps, receiving user inputs and responsive to the user inputs changing a viewing perspective of the three dimensional representation of the human subject.

2. The teaching method of claim 1, wherein changing a viewing perspective of the human subject comprises at least one of rotating the three dimensional representation of the human subject, panning with respect to the three dimensional representation of the human subject, and zooming with respect to the three dimensional representation of the human subject.

3. The teaching method of claim 1, wherein collecting source information includes collecting at least one of form, skin type, head surface contours, hair texture, and color.

4. The teaching method of claim 1, further comprising:
   displaying a bar having a three dimensional object and receiving inputs from a pointing device with respect to the three dimensional object indicating at least one of rotation of the three dimensional object and sliding of the three dimensional object along the bar;
   rotating the three dimensional representation of the human subject responsive to inputs from the pointing device indicating rotation of the three dimensional object;
   advancing or reversing the series of steps with respect to the human subject responsive to inputs from the pointing device indicating sliding of the three dimensional object along the bar.

5. The teaching method of claim 1, further comprising, while graphically displaying the progression of the three dimensional representation of the human subject undergoing the series of steps, receiving user inputs and responsive to the user inputs altering the ordering of the series of steps.

6. The teaching method of claim 1, wherein the series of steps illustrate treatments to the hair of the human subject.

7. The teaching method of claim 6, wherein the treatments to the hair of the human subject include at least one of cutting and coloring steps.

* * * * *